United States Patent

[11] 3,614,494

[72] Inventors Alwin Borchers
 Flensburg, Germany;
 Kyrre Guttorm Sjotun, Norge; Gunnar
 Lyshoj Hansen, Nordborg; Jorgen Rono
 Clausen, Langeso pr. Nordborg, Denmark
[21] Appl. No. 38,322
[22] Filed May 18, 1970
[45] Patented Oct. 19, 1971
[73] Assignee Danfoss A/S
 Nordborg, Denmark
[32] Priority May 17, 1969
[33] Germany
[31] P 19 25 305.5

[54] SINGLE-PHASE ELECTRIC MOTOR
 2 Claims, 3 Drawing Figs.
[52] U.S. Cl. ................................................... 310/126,
 310/166
[51] Int. Cl. .......................................................H02k 17/00
[50] Field of Search........................................... 310/112,
 114, 124, 125, 126, 166, 211

[56] References Cited
FOREIGN PATENTS
505,237 8/1951 Belgium ....................... 310/126
158,951 11/1963 U.S.S.R. ....................... 310/125

Primary Examiner—D. X. Sliney
Attorney—Wayne B. Easton

ABSTRACT: The invention relates to a single-phase electric motor assembly for installations such as oil burners. The motor has two oppositely rotatable rotors with one rotor adapted to drive a blower and the other adapted to drive an oil pump. The stator has main and secondary windings offset from each other which are switchable on and off together. The current phase in the secondary winding leads by up to 20° upon startup and remains above 0° at the highest operating voltage. There is a time lag during which the blower rotor builds up speed and it is only thereafter that its rotary field acts on the pump rotor to drive it in the opposite direction. Alternate hydraulic and mechanical means are provided for making the pump effective in only one operating direction.

PATENTED OCT 19 1971 3,614,494

SINGLE-PHASE ELECTRIC MOTOR

The invention relates to a single-phase electric motor, in which two rotors, turning in opposite directions are associated with a stator having two windings offset from each other, the first of which (the secondary winding) is differently designed from the second (the main winding), while the second of the rotors starts up in its operating direction only after the first has substantially fully started up, the motor being for use particularly with oil burners, in which the first rotor powers a blower and the second rotor, after a time lag, powers an oil pump.

In the case of a single-phase motor of this kind, both rotors are firstly subjected to a driving torque in the same direction of rotation. If the second rotor starts up more slowly than the first or if it is even kept stationary, in certain cases the second rotor is subjected to a driving torque in the opposite direction of rotation after some time. The construction on the stator side corresponds to that of a normal single-phase motor; a main winding is present and also a secondary winding which is cut out after both rotors are turning at speed.

Generally, the second rotor is so designed that it is enabled to carry out effective work only when it is rotating in a direction opposite that of the first rotor. This is the case for example in an earlier proposal in which the first rotor powers a blower for a heating installation and the second rotor an associated oil pump which operates only in one direction. If the second rotor does not start up in the opposite direction, the insulation breaks down.

If, in the case of a single-phase motor of this kind, a short interruption occurs in the supply of voltage, it may happen that the first rotor, connected to the blower, will still turn when current is supplied again, and therefore assumes its normal speed, whereas the second rotor has already come to a stop and—since the secondary winding had been cut off—can only turn in the same direction as the first rotor or cannot start up at all. Furthermore, it has been found that the effect of the delayed starting up of the second rotor in the opposite direction is greatly dependent upon the voltage applied. In particular, an increase in voltage within the normal permitted limits has often been sufficient to prevent the second rotor from starting up in the required direction.

The object of the invention is to provide a single-phase electric motor having two rotors adapted to turn in opposite directions to each other, which motor is not affected by the above-mentioned troubles when current is briefly interrupted and when voltage fluctuations occur.

According to the invention, this object is achieved by both windings being capable of being switched in and cut out jointly, and by the difference in the phases of the currents in the two windings being less than 20° at the amount of start up, but not having dropped below 0°, at the highest possible operating voltage, up to the point at which the second rotor begins to start up in its operating direction.

Since the auxiliary winding always remains switched in during the running of the motor, it operates in the normal manner even after the current has been interrupted, so that the second rotor can start up in its operating direction opposite to the direction of the first rotor. However, in order to prevent any trouble occurring during operation because of the auxiliary winding being constantly effective, it is so designed that the difference between the phases of the currents in the windings is considerably smaller than usual. It is interesting that it has been found that, in the case of single-phase motors having two rotors, good starting conditions are created despite the smaller phase difference. Initially only the starting moment for the first rotor and the unit coupled thereto really needs to be available. After the first motor has reached speed, its rotary field acts on the second rotor in such manner that the latter produces a considerable breakdown torque as it is starting up. The smaller the driving moment for the unit to be powered by the first rotor, the smaller can be the difference in phase; after the first rotor has reached speed, an adequate moment is available for the second rotor.

Independently of this, a lower limit should be observed for the phase difference. The phase difference is dependent both on the operating voltage and the condition of the rotors when running at speed. In order to be sure that the second rotor starts up in the correct direction under all operating conditions, the phase difference, at the highest possible operating voltage, should not have fallen below 0° at the commencement of startup of the second rotor in its operating direction.

In practice, a phase difference at 5°–8° at the moment of startup has proved very advantageous at nominal voltage. With such a phase difference, both the blower and, after a time lag, the oil pump of a heating installation can be reliably driven within a voltage range of 160–240 V.

The required small phase difference can also be obtained in a simple manner, when the ohmic resistance of the secondary phase is higher, by providing the secondary winding with a greater number of turns than the main winding.

The number of turns in the secondary winding is advantageously at least twice the number of turns in the main winding. In an arrangement actually used, good results were obtained with a factor of 2.7.

In order to be able properly to utilize the space conditions in the stator, despite these differences in the numbers of turns, it is advisable for the main winding to be made of a material, e.g. aluminum, having a greater specific resistance than that of the material, e.g. copper, of the secondary winding.

A further advantage is achieved, if the phase of the current in the secondary winding leads that of the main winding. The risk of the phase difference dropping below 0°, when the voltage rises, is then reduced.

In accordance with a further aspect of the invention, the product of the length and resistance of the first rotor should be greater than that of the second rotor. In particular, the length of the rotors should be substantially the same, and the resistance of the first rotor greater than that of the second rotor. This can be achieved by, for example, making the short-circuiting rings and, if required, the rods of the first rotor of aluminum and those of the second rotor of copper. Such an arrangement ensures that the starting torque of the first rotor is so great that this rotor starts up first. Because of its reversal of direction, it is here unimportant that the second rotor acquires a smaller starting torque. For this however, the second rotor, as a result of its lower rotor resistance, has a higher breakdown torque than is exactly required for a pump. Where the rotors are of the same length, practice has shown that a resistance ratio of 1:1.3 gives good results. This idea can also be applied with advantage in the case of motors of this kind having a secondary phase that can be cut out.

It is also expedient to render the pump ineffective up to the point at which startup takes place in the operating direction. This can be done by providing the pump with a short-circuiting path containing a nonreturn valve through which the oil is circulated if the pump is driven in a direction opposite that of its operating direction. It is also very advantageous to associate, with the second rotor, a means permitting rotation only in the operating direction. In the last-mentioned case, a greater torque for driving the first rotor is available.

The single-phase motor that has been described is also suitable for other purposes, e.g. for powering the blower of a gas-heating system, in which the second rotor opens a gas valve after a timelag, it being possible to do this for example through a connected torsion spring, which closes the gas valve again after the motor has been cut off.

The invention will now be described in more detail in the drawing, in which.

Figure 1:
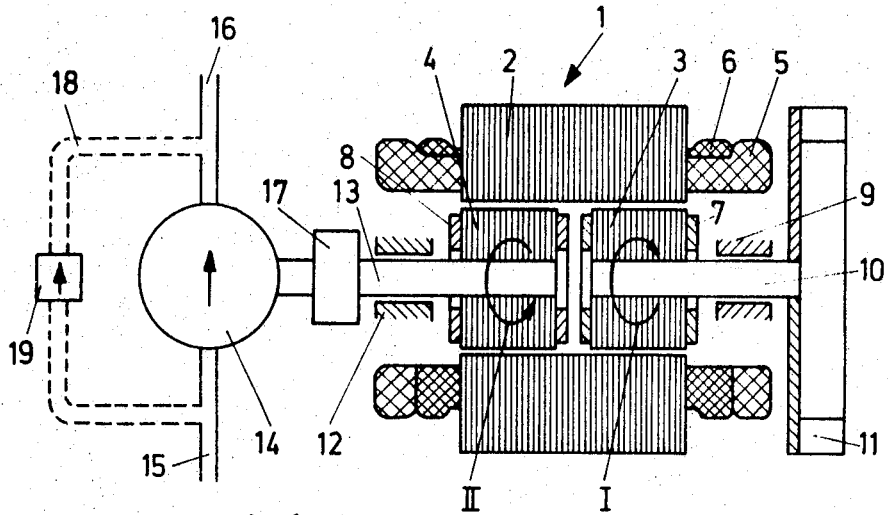
FIG. 1 is a schematic illustration of the single-phase motor of the invention.

The single-phase motor 1 has a stator 2, a first rotor 3 and a second rotor 4. The stator has a main winding 5 and a secondary winding 6, and the rotor 3 has a squirrel cage 7 and the rotor 4 a squirrel cage 8. The rotor 7 drives a blower wheel 11 through a shaft 10 mounted in a bearing 9. Through a shaft 13 mounted in a bearing 12, the rotor 4 drives an oil pump 14, which takes in oil through a pipe 17 and passes it to an atomizer nozzle by way of a pipe 16.

Associated with the shaft 13 is a blocking element 17 which prevents the rotor 4 from rotating in the direction of the arrow I(operating direction of the rotor 3), and only permits rotation in the direction of the arrow II. Instead of this, a clutch can also be provided that drives the pump 14 only when the rotor 4 rotates in the direction of the arrow II. It is also possible to associate, with the pump, a short-circuiting passage 18 containing a nonreturn valve 19 which opens when the pump 14 is driven by the rotor 4 in such manner that it passes oil in a direction opposite its normal operating direction.

Figure 2:
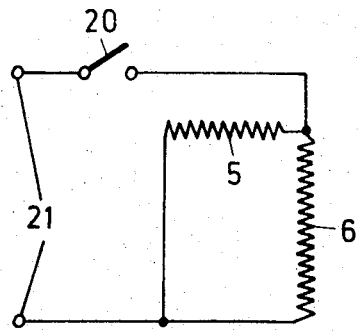
FIG. 2 shows a connection diagram for this single-phase motor.

The circuitry of the stator windings is very simple. As shown in FIG. 2, the main winding 5 and the secondary winding 6 are connected in parallel and connected to the supply terminals 21 through a common switch 20.

Figure 3:
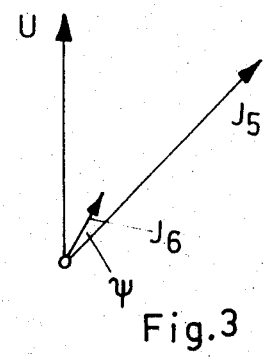
FIG. 3 is a current-voltage diagram for the currents in the two stator windings.

Referring to FIG. 3, the current $I_5$ through the main winding 5 and the current $I_6$ through the secondary winding 6 are illustrated in their phase position with regard to the voltage U. Between the currents $I_5$ and $I_6$ is a phase difference $\psi$ which in the present case is intended to be less than 20° when the motor is switched on, and which in practice can be in the order of 6° to 7° and, even at the highest possible operating voltage U, will not have dropped below 0° at the commencement of start-up of the second rotor in its operating direction II.

In one construction, the main winding 5 occupied two-thirds of the pole-pitch and the secondary winding one-third. The secondary winding was of copper and had 2.7 times as many turns as the main winding 5, made of aluminum. The stacks of the laminations constituting the rotors 3 and 4 were of the same length. The resistance of the squirrel cage 7 however was 30 percent greater than the resistance of the cage 8.

When a blocking element 17 is used, the mode of operation of the motor is as follows: When the switch 20 is brought to the on position, the first rotor 3 initially starts up in the direction of the arrow I, whilst the second rotor 4, to which is applied a torque acting in the same direction, is held by the blocking member 17. After the first rotor 3 has more or less reached speed, the rotary field that it produces also acts on the second rotor 4 and the latter begins to start up in the direction of the arrow II. A sufficiently great torque is available to drive the pump 14. Since the pump 14 starts up some time after the blower 11, this ensures that there is a sufficient amount of intake air for combustion purposes when the oil enters the combustion space. When the motor is switched off, the rotor 4 comes rapidly to a stop as a result of loading by the pump 14, whereas the rotor 3 and the blower wheel 11 run down over a longer period, which is advantageous for discharging air again from the combustion space.

When voltage is again available after interruption of the current, the motor 1 automatically starts up again, since the secondary winding remains continuously switched in. Here, it is immaterial whether one or both rotors have come to a stop.

The voltage at the terminals 21 varies, the phase-position of the current $I_5$ and $I_6$ relatively to the voltage U alters because of the nonlinear impedance. As the voltage rises the phase difference $\psi$ is reduced. This reduction has no disadvantage as regards startup, since the voltage or the currents will have risen; however, the phase difference should not have fallen below the value 0° when the second rotor starts up. If the voltage drops, this phase difference also becomes greater, so that despite reduced voltage an adequate starting torque is available.

We claim:

1. A single-phase electric motor assembly comprising first and second rotors, a stator having main and secondary windings offset from each other with the phase angle between the respective currents of said windings being less than 20° upon startup and above 0° at the highest operating voltage, circuit means for switching said windings on and off together, means causing said second rotor to be driven in the opposite direction from said first rotor, a blower attached to said first rotor and a pump is attached to said second rotor, and means for limiting effective pumping of said pump until after said first rotor begins turning.

2. A motor according to claim 1 wherein said means allows rotation of said second rotor in the opposite direction of rotation of said first rotor.